(12) United States Patent  
Stubbe-Østergaard

(10) Patent No.: US 8,761,378 B2  
(45) Date of Patent: Jun. 24, 2014

(54) DYNAMIC CONNECTION DISTRIBUTOR

(75) Inventor: Johan Stubbe-Østergaard, Copenhagen (DK)

(73) Assignee: Actimizer A/S (DK)

( * ) Notice: Subject to any disclaimer, the term of this patent is extended or adjusted under 35 U.S.C. 154(b) by 1240 days.

(21) Appl. No.: 12/302,404

(22) PCT Filed: May 30, 2006

(86) PCT No.: PCT/DK2006/000301  
§ 371 (c)(1),  
(2), (4) Date: Nov. 25, 2008

(87) PCT Pub. No.: WO2007/137575  
PCT Pub. Date: Dec. 6, 2007

(65) Prior Publication Data  
US 2009/0175438 A1    Jul. 9, 2009

(51) Int. Cl.  
*H04M 3/00*    (2006.01)

(52) U.S. Cl.  
USPC ................................ 379/265.11; 379/265.01

(58) Field of Classification Search  
USPC .............. 379/265.01–265.14, 220; 370/352  
See application file for complete search history.

(56) References Cited

U.S. PATENT DOCUMENTS

| | | | |
|---|---|---|---|
| 5,436,965 A | | 7/1995 | Grossman |
| 5,778,060 A | | 7/1998 | Otto |
| 5,793,762 A | * | 8/1998 | Penners et al. ............... 370/389 |
| 5,848,143 A | * | 12/1998 | Andrews et al. ......... 379/265.09 |
| 6,373,836 B1 | * | 4/2002 | Deryugin et al. ............ 370/352 |
| 6,411,805 B1 | * | 6/2002 | Becker et al. ............. 455/414.1 |
| 6,773,836 B2 | * | 8/2004 | Kim et al. ..................... 428/704 |
| 8,036,374 B2 | * | 10/2011 | Noble, Jr. ................. 379/266.08 |
| 2002/0001300 A1 | | 1/2002 | Miloslavsky et al. |
| 2002/0145624 A1 | * | 10/2002 | Szlam et al. .................. 345/738 |
| 2006/0093116 A1 | * | 5/2006 | Baird ....................... 379/209.01 |
| 2007/0098146 A1 | | 5/2007 | Rice |

FOREIGN PATENT DOCUMENTS

EP            1443741          8/2004

OTHER PUBLICATIONS

Irish C: "Web-Enabled Call Centre"; BT Technology Journal, Springer, Dordrecht, NL, vol. 18, No. 2, Apr. 2000, pp. 65-71, XP000958414, ISSN: 1358-3948.

"Gehender Telefonverkehr Als Strategie Predictive Dialling Entdeckt Das Telefon Neu"; Nov. 1, 1993, Nachrichten Elektronik Und Telematik, Verlag Dr. Huethig. Heidelberg, De, pp. 51-518, XP000416984, ISSN: 0177-5499.

\* cited by examiner

*Primary Examiner* — William Deane, Jr.  
(74) *Attorney, Agent, or Firm* — Cantor Colburn LLP

(57) ABSTRACT

The invention relates to a dynamic call connection distributor (DCD) comprising —an agent pool (AP), comprising information of call agents (CA), said agent pool is at least partly configurable by a plurality of individual call agents (CA), —a recipient dialer (RD), comprising circuitry for dialing at least one number of predefined potential recipients (PR) for establishment of a recipient connection (RC), —an agent dialer (AD) comprising circuitry for establishing an agent connection (AC) from said dynamic connection distributor (DCD) to a call agent (CA), a call linker (CL), comprising circuitry for linking said agent connection (AC) with said recipient call (RC). According to a preferred embodiment of the invention, the agent pool is basically maintained dynamically by the call agents themselves, thereby allowing basically any physical distribution in contrary to prior art systems requiring the call agents to operate at fixed and centrally defined endpoints.

20 Claims, 10 Drawing Sheets

DYNAMIC CONNECTION DISTRIBUTOR

FIELD OF THE INVENTION

Figure 1:
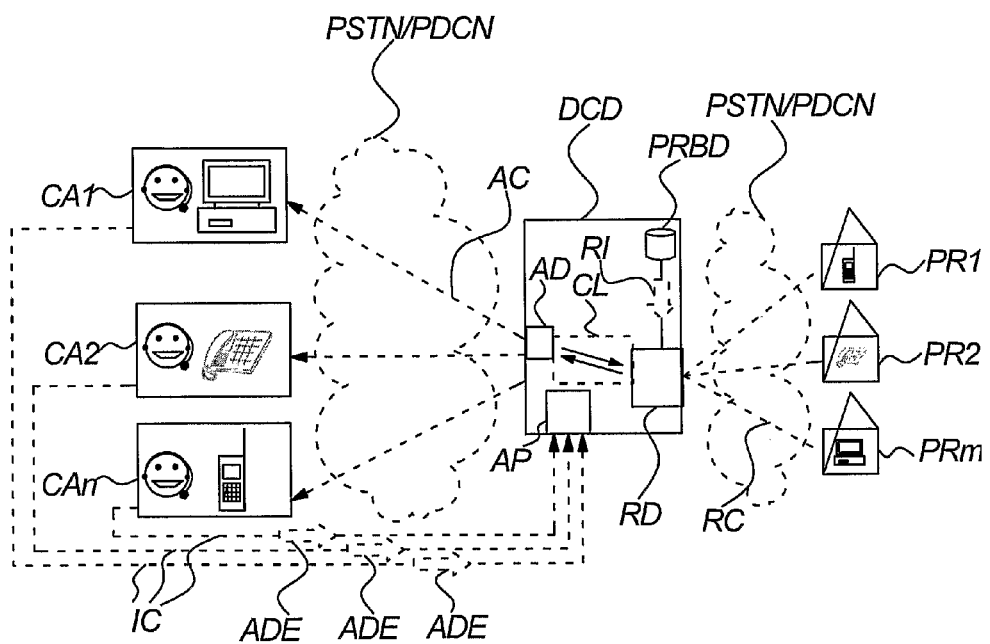

The inventions relates to the field of telecommunication. More particular the invention concerns with a dynamic call connection distributor.

BACKGROUND OF THE INVENTION

Modern call centers and telemarketing centers provide services for automatically controlling the dialing of numbers, and finding an available agent at the call center.

Outbound calls from a call center are usually made by a power dialer or a predictive dialer, and when a connection to a customer is established the call is distributed to an available agent via an ACD (ACD: automatic call distribution).

Furthermore, modern systems provide the possibility for a call agent to be able to work from home as effectively as from an office. These solutions provide so-called "remote agent stations", where a central system, e.g. a switch with ACD-like features, is located at a central call center is able to distribute calls to remote agents as well as to local agents at more or less the same terms. Thus, the central system can maintain a status of the remote agent, e.g. availability, present status, duration of present call, etc.

U.S. Pat. No. 5,778,060 describes a central system based on a conventional ACD switch (ACD: Automatic Call Distribution), which is connected to remote agents and local agents, who continuously transmit their status to the ACD switch via the fixed network of the ACD. Thereby it is possible for the ACD switch to distribute calls to remote agents at the same terms as to the local agents.

A problem related to the prior art systems of the abovementioned type is however that the systems lack dynamics. Moreover, a problem relating to the prior art is that the systems require expensive equipment situated at the premises of the call agent in order to allow operation of the system and that operation and maintenance of the local switch is extremely expensive.

SUMMARY OF THE INVENTION

The invention relates to a dynamic call connection distributor comprising
- an agent pool, comprising information of call agents, said agent pool is at least partly configurable by a plurality of individual call agents,
- a recipient dialer, comprising circuitry for dialing at least one number of predefined potential recipients for establishment of a recipient connection,
- an agent dialer comprising circuitry for establishing an agent connection from said dynamic connection distributor to a call agent,
- a call linker, comprising circuitry for linking said agent connection with said recipient call.

According to an embodiment of the invention, the dynamic connection distributor is easily configurable since no predefined connections exist in the agent pool whatsoever. The connections may thus be established exclusively on the basis of agent-defined endpoints, which are registered in the agent pool from a remote distance and hereby configures the agent pool.

Thus, the invention overcomes the problem relating to prior art systems where the connection between the call agents and the ACD necessarily relies on dedicated, predefined connections and endpoints, e.g. a predefined local telephone number or a VPN (VPN: Virtual private network) tunnel, to the central system or ACD switch.

Furthermore, the invention relates to a dynamic call connection distributor comprising—an agent pool, comprising information of call agents, said agent pool is at least partly configurable by a plurality of individual call agents,
- a recipient dialer, comprising circuitry for dialing at least one number of predefined potential recipients for establishment of a recipient connection,
- an agent dialer comprising circuitry for establishing an agent connection from said dynamic connection distributor to a call agent,
- a call linker, comprising circuitry for establishing an agent call through said agent connection to an available call agent and linking said agent call with said recipient call, In an embodiment of the invention, said agent pool is at least partly defined and maintained by distributed call agents by means of web interface.

According to a preferred embodiment of the invention, the agent pool is basically maintained dynamically by the call agents themselves, thereby allowing basically any physical distribution in contrary to prior art systems requiring the call agents to operate at fixed and centrally defined endpoints.

In an embodiment of the invention, said call linker establishes a call between a call agent and a recipient by connection of at least two outbound calls.

According to a further preferred embodiment of the invention, a call is established by connection of outbound calls from the call connection distributor to call agents and outbound calls from the call connection distributor to recipients, thereby allowing the system to be coupled and applied as an independent add-on to any local switch or telephone system.

In an embodiment of the invention, said agent pool comprises information of currently available call agents.

In an embodiment of the invention, said dynamic connection distributor further comprises a potential recipient database, comprising information of potential recipients to be dialed by said recipient dialer.

In an embodiment of the invention, said call linker comprises circuitry for linking a call, answered by a recipient with a connection established to an available call agent.

In an embodiment of the invention, said dynamic connection distributor comprises circuitry for establishing an agent connection from said dynamic connection distributor to a call agent on the basis of an agent-defined endpoint.

An agent-defined endpoint may e.g. comprise telephone number, IP addresses, VoIP numbers, etc.)

In an embodiment of the invention, said agent connection is maintained during an agent session and terminated when the session is ended.

In an embodiment of the invention, said agent session is initiated on the basis of a session start-up.

In an embodiment of the invention, said session start-up involves transmission of an agent-defined endpoint (ADE) from a distributed call agent to said agent pool.

In an embodiment of the invention, said session start-up involves transmission via PDCN (PDCN: Public Data Communication Network) of an agent-defined endpoint from a distributed call agent to said agent pool.

In an embodiment of the invention, said session start-up involves receipt of an agent-defined endpoint transmitted from a remote call agent.

In an embodiment of the invention, said session start-up involves receipt of an agent-defined endpoint transmitted from a remote call agent via PSTN (PSTN: Public Switched Telecommunication Network).

In an embodiment of the invention, said potential recipient database comprises information of the potential recipient endpoints.

Potential recipient endpoints may e.g. comprise telephone number, IP addresses, VoIP numbers, etc.

In an embodiment of the invention, said potential recipient database comprises additional information of the potential recipients.

Furthermore, the invention relates to a dynamic call connection distributor, wherein said system further comprises
   potential recipients defined by said dynamic connection distributor in said potential recipient database,
   a number of call agents possessing the possibility to register an agent-defined endpoint in an agent pool located in said dynamic connection distributor, whereupon said dynamic connection distributor establishes a connection to said agent-defined endpoint.

In an embodiment of the invention, said registering of said agent-defined endpoint in said agent pool comprises transmission of agent-defined endpoint information from said call agent to said agent pool through an initiating connection.

The initiating connections may also be regarded as the connections necessary to establish and maintain call sessions with respect to control of calls to the call agent and from the dynamic connection distributor and with respect to logging of sessions, transfer or orders, transfer of order information, monitoring of agent performance, transfer of statistics, transfer of recipient relevant data, etc.

Furthermore, the invention relates to a method of establishing a connection between a call agent and potential recipients in a system comprising,
   a dynamic connection distributor,
   potential recipients defined by said dynamic connection distributor in a potential recipient database,
   a number of call agents to be dynamically connected to said potential recipients via said dynamic connection distributor,
said method comprising the steps of
transmitting agent-defined endpoints to said dynamic connection distributor,
establishing an agent connection from said dynamic connection distributor to said agent-defined endpoint,
establishing an agent call via said agent connection between a recipient extracted from a potential recipient database.

Furthermore, the invention relates to a method of establishing a connection between a call agent and potential recipients in a system comprising,—a dynamic connection distributor,
   potential recipients defined by said dynamic connection distributor in a potential recipient database,
   a number of call agents to be dynamically connected to said potential recipients via said dynamic connection distributor,
said method comprising the steps of
transmitting agent-defined endpoint to said dynamic connection distributor,
establishing an agent connection from said dynamic connection distributor to said agent-defined endpoint,
establishing an agent call, via said agent connection between a recipient extracted from a potential recipient database.

In an embodiment of the invention, said agent-defined endpoint is transmitted to said dynamic connection distributor by at least two call agents.

In an embodiment of the invention, said agent-defined endpoint is transmitted to said dynamic connection distributor by at least two distributed call agents by means of a web-based interface.

It is a very advantageous feature of the invention that the call agents may be distributed. The distribution of call agents means that call agents may in principle be physically located anywhere while utilizing the system. In accordance with the invention, a call agent will just have to register in the agent pool and preferably via a web interface, and hereby specify an endpoint, e.g. a telephone number, after which the session of receiving agent calls may begin. Thus, the call agents fully define the agent-defined endpoints in the agent pool of the dynamic connection distributor without any correlation between the physical location of the call agent and the place where the endpoint, e.g. telephone number is registered. Evidently of course the system may further apply supplemental fault detection and correction algorithms in order to detect agent invoked mistakes with respect to designation of endpoints.

Thus, the system according to the above embodiment of the invention intrinsically benefits from flexibility throughout all principle components of the system. Thus, the invention facilitates that such systems may centrally be applied as plug-and-play solutions without interfering with the setup of a company's existing switches, PBX, CTI etc.

Moreover, the invention facilitates that a call agent may be connected to a potential recipient via an outbound call from the central dynamic connection distributor without requirement of complex hardware setup procedures and configuration.

Moreover, the agent connection may be controlled decentralized by means of a simple standard web interface and a standard PSTN or PDCN connection.

According to the present invention, a call agent may for example register in the agent pool with the private telephone number of his brother while visiting his brother, and then use his brothers' telephone for receiving agent calls from the dynamic connection distributor.

Another example is that a call agent may work while shuttling to and from work by registering in the agent pool of the dynamic connection distributor via a web interface of his Personal Digital Assistant (PDA) or laptop, and register the agent-defined endpoint to be his mobile phone. This way the call agent will be able to receive agent calls from the dynamic connection distributor on his mobile phone while shuttling to and from work.

In an embodiment of the invention, said web-based interface is established at a unit comprising computing facilities for use by a call agent.

In an embodiment of the invention, said web-based interface is presented to a user via a non-dedicated personal computer (PC).

According to the invention, the web-based interface is to be presented for the user on a regular Personal Computer which may e.g. be a computer comprising a central processing unit, a computer running a Linux or Windows operative system, an Apple Macintosh, etc. It is a very advantageous feature of an embodiment of the invention that the PC presenting the web interface is used for transmitting agent-defined endpoints.

In an embodiment of the invention, said transmitted agent-defined endpoint is transmitted to said dynamic connection distributor as a code referring to at least one audio communication address predefined in an agent pool of said dynamic connection distributor.

The audio communication address may e.g. comprise a telephone number, an IP address, predefined in an agent pool of said dynamic connection distributor. When coding the agent-defined endpoint, it is possible at the same time to establish an authentication and/or authorization of the call agent which may be defined in the DCD. The code may thus e.g. pinpoint one or one of several telephone numbers by which the call agent may be reached for establishment of an agent connection (AC).

In an embodiment of the invention, said transmitted agent-defined endpoint is transmitted to said dynamic connection distributor as an audio communication address by means of which said dynamic connection distributor establishes an agent connection.

When the agent-defined endpoint is transmitted as such to the dynamic connection distributor it is possible for e.g. a call agent to be reached at any possible and suitable audio communication address selected by the call agent.

In an embodiment of the invention, said transmitted agent-defined endpoint is transmitted to said dynamic connection distributor as an audio communication address and an associated security code on the basis of which said dynamic connection distributor establishes an agent connection.

When combining an audio communication address with a security code it is possible to allow the call agent to define his own endpoint as long as he is recognized by the DCD. In this way a call agent may be incorporated in the system at e.g. any telephone number he or she desires, thereby obtaining a significant degree of freedom. The system may thus establish agent connections to various agent-defined endpoints under continuous control by the call agent. Typically and preferably an agent-defined endpoint is maintained throughout a session.

In an embodiment of the invention, the dynamic connection distributor maintains call activity accounts related to the individual call agents.

The call activity accounts related to the individual call agents may e.g. comprise information related to a number of calls between the specified agent and recipients, duration of these calls, success criteria measuring related to these calls, customer satisfaction evaluation of these calls, etc.

In an embodiment of the invention, said transmission of agent-defined endpoints is initiated by the call agent.

In an embodiment of the invention, the steps of establishing a recipient call, linking said agent call with said recipient call is repeated with at least two different potential recipients during a session.

In an embodiment of the invention, said agent connection may comprise dialing a telephone number over PSTN.

In an embodiment of the invention, said agent connection may comprise establishing a connection to a specific destination over PDCN, e.g. IP address.

In an embodiment of the invention, said agent connection is established automatically on the basis of agent-defined endpoints.

In an embodiment of the invention, said agent-defined endpoint comprises information of which telephone number to dial.

In an embodiment of the invention, said ADE comprises information of which address to contact over PDCN, e.g. IP address.

In an embodiment of the invention, said agent-defined endpoints are transmitted via a web interface over PDCN.

In an embodiment of the invention, said agent-defined endpoints are transmitted via PSTN.

In an embodiment of the invention, said recipient call is established by dialing a telephone number via a PSTN.

In an embodiment of the invention, said recipient call is established by dialing a telephone number via PDCN.

In an embodiment of the invention, said recipient call is established by means of a recipient dialer.

In an embodiment of the invention, said method is initiated by an initiating connection and whereby said initiating connection involves that a call agent transmits said agent-defined endpoint to the dynamic connection distributor.

In an embodiment of the invention, said method is initiated by an initiating connection and whereby said initiating connection involves that a call agent transmits said agent-defined endpoint to the dynamic connection distributor and whereby said initiating connection initializes a session.

In an embodiment of the invention, said initiating connection is established by means of a telephonic call over PSTN.

In an embodiment of the invention, said initiating connection is established over PDCN e.g. via a web interface.

In an embodiment of the invention, said call agent is situated externally with respect to said dynamic connection distributor.

In an embodiment of the invention, said session is continued by establishment of further connections between a call agent and further recipients until a call agent actively communicates to the dynamic connection distributor that a call session is to be ended.

Furthermore, the invention relates to use of agent-defined endpoints to automatically establish a call between a potential recipient and a call agent by means of a central dynamic connection distributor.

Furthermore, the invention relates to use of agent-defined endpoints, wherein said agent-defined endpoint is transmitted by means of a web interface.

Furthermore, the invention relates to a dynamic connection distributor comprising a web-based interface wherein said dynamic connection distributor is at least partly configured and maintained by distributed call agents via said web-based interface.

In an embodiment of the invention, said dynamic connection distributor comprises a call linker for connecting an agent connection with a recipient connection.

Furthermore, the invention relates to a call linker comprising call connection circuitry for connection of at least two outbound calls from said call dialer into a call connection between at least one call agent and at least one potential recipient.

According to a further preferred embodiment of the invention, a call is established by connection of outbound calls from the dynamic connection distributor to call agents and outbound calls from the call connection distributor to recipients, thereby allowing the system to be coupled and applied as an independent add-on to any local switch or telephone system.

Furthermore, the invention relates to a call linker comprising call connection circuitry for connection of at least two outbound calls from said call dialer into a call connection between at least one call agent and at least one potential recipient.

THE DRAWINGS

The invention will now be described with reference to the drawings of which

Figure 2:
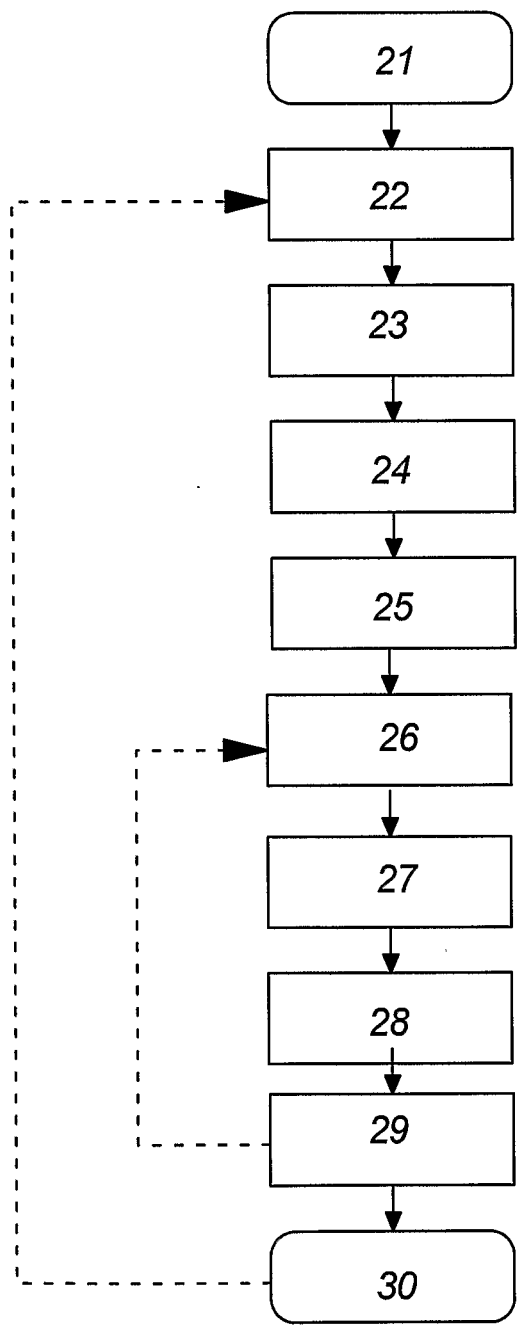
Figure 2A:
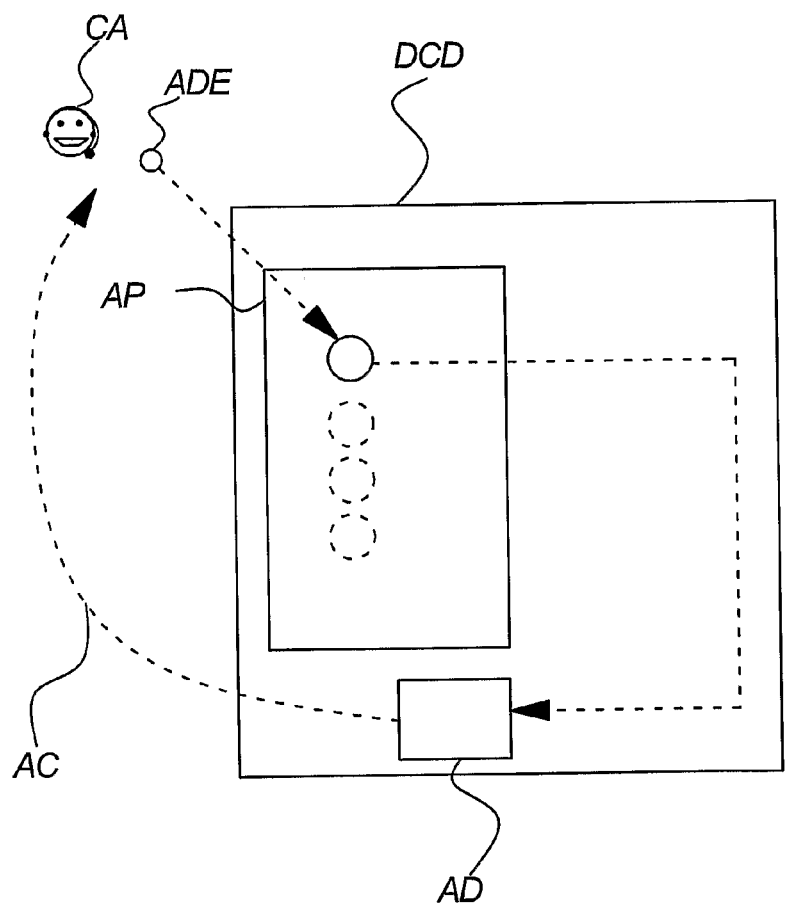
Figure 3:
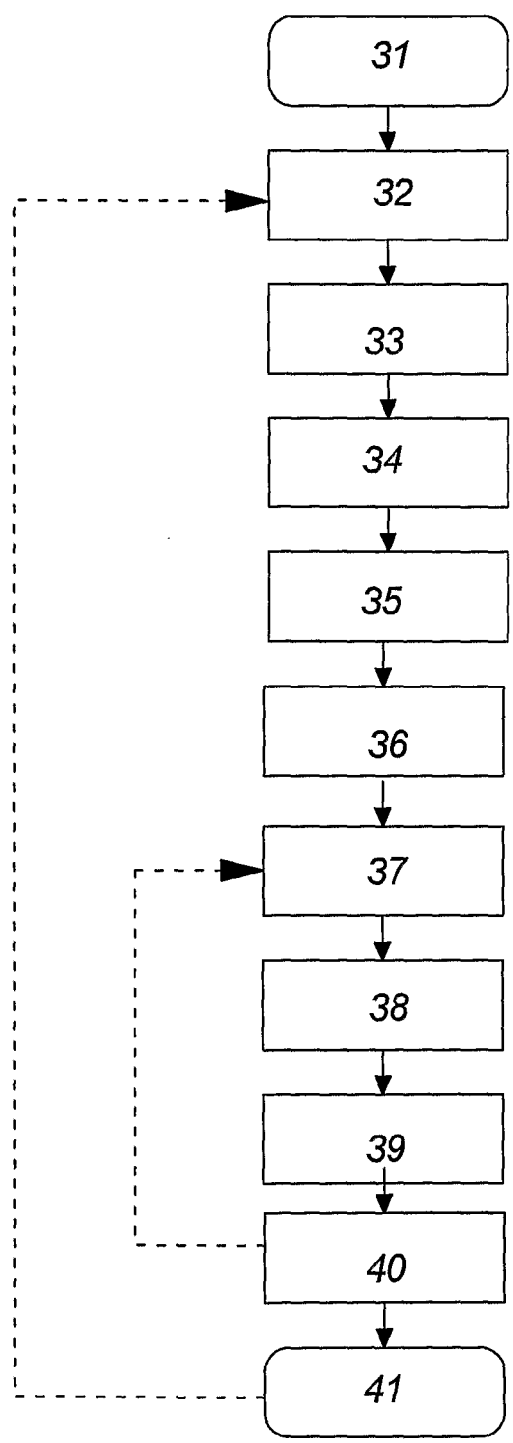
Figure 3A:
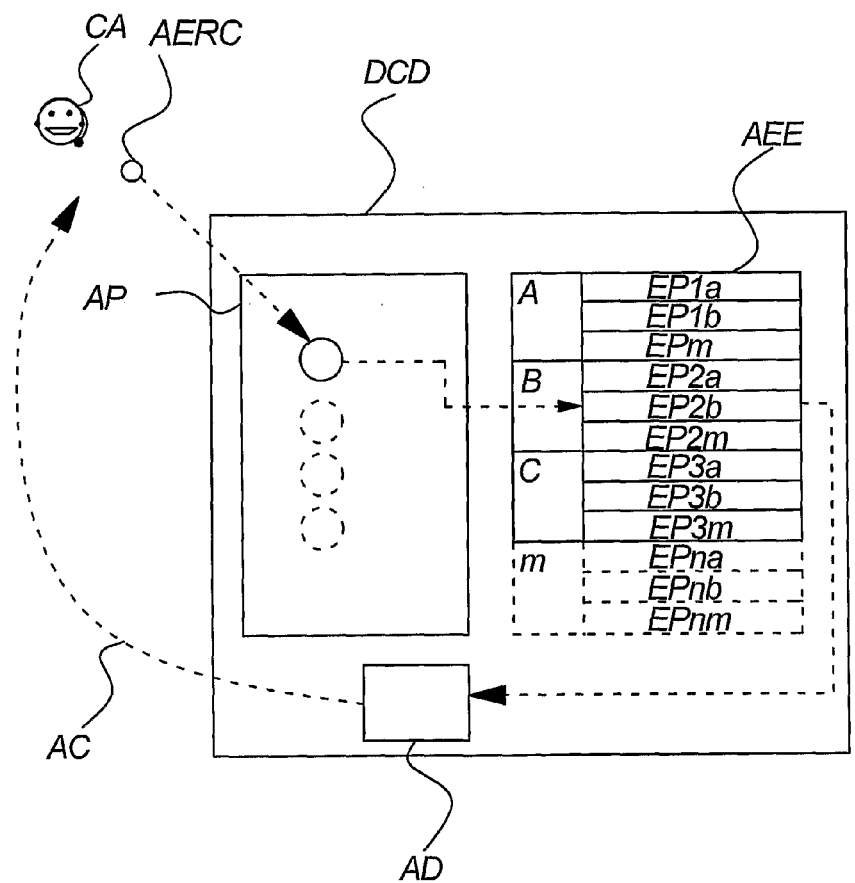
Figure 4:
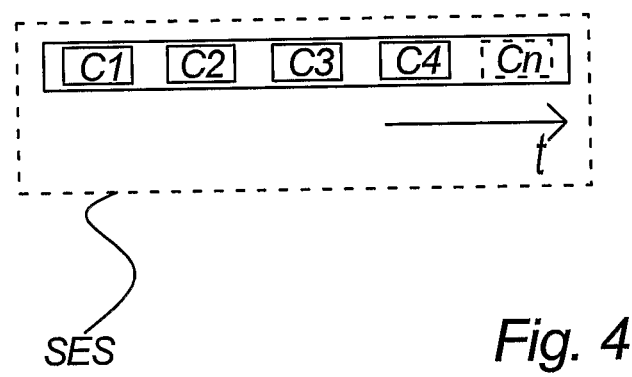
Figure 5:
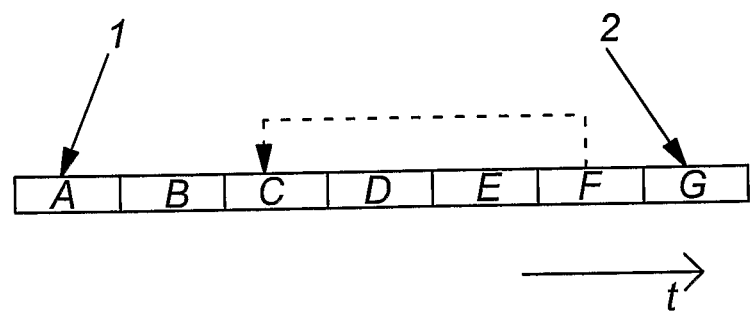
Figure 6:
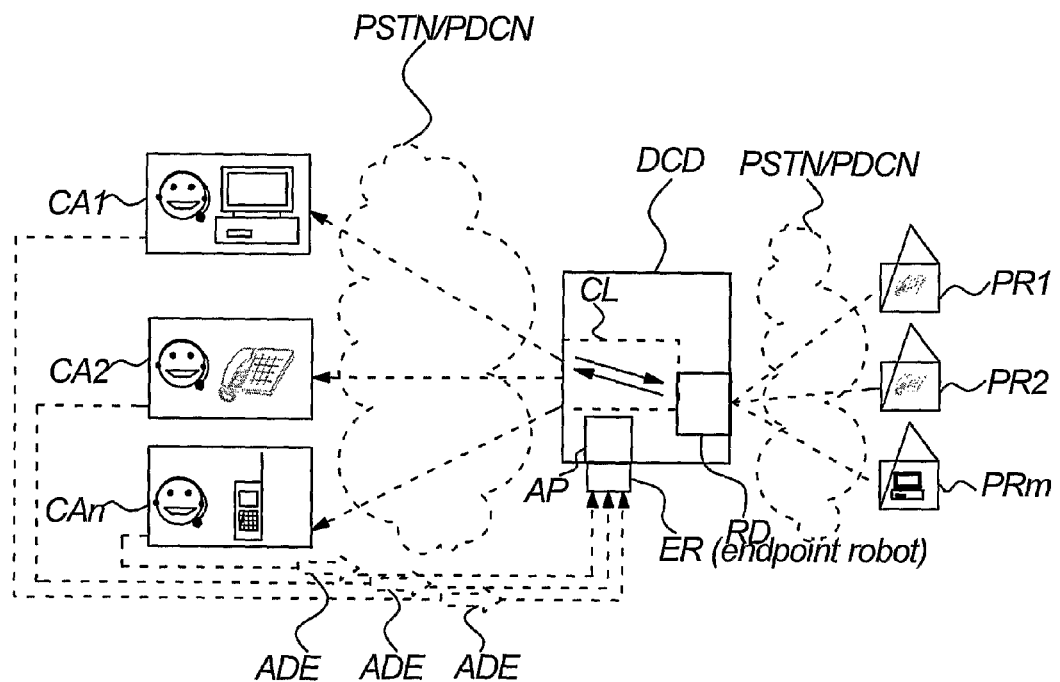
Figure 7:
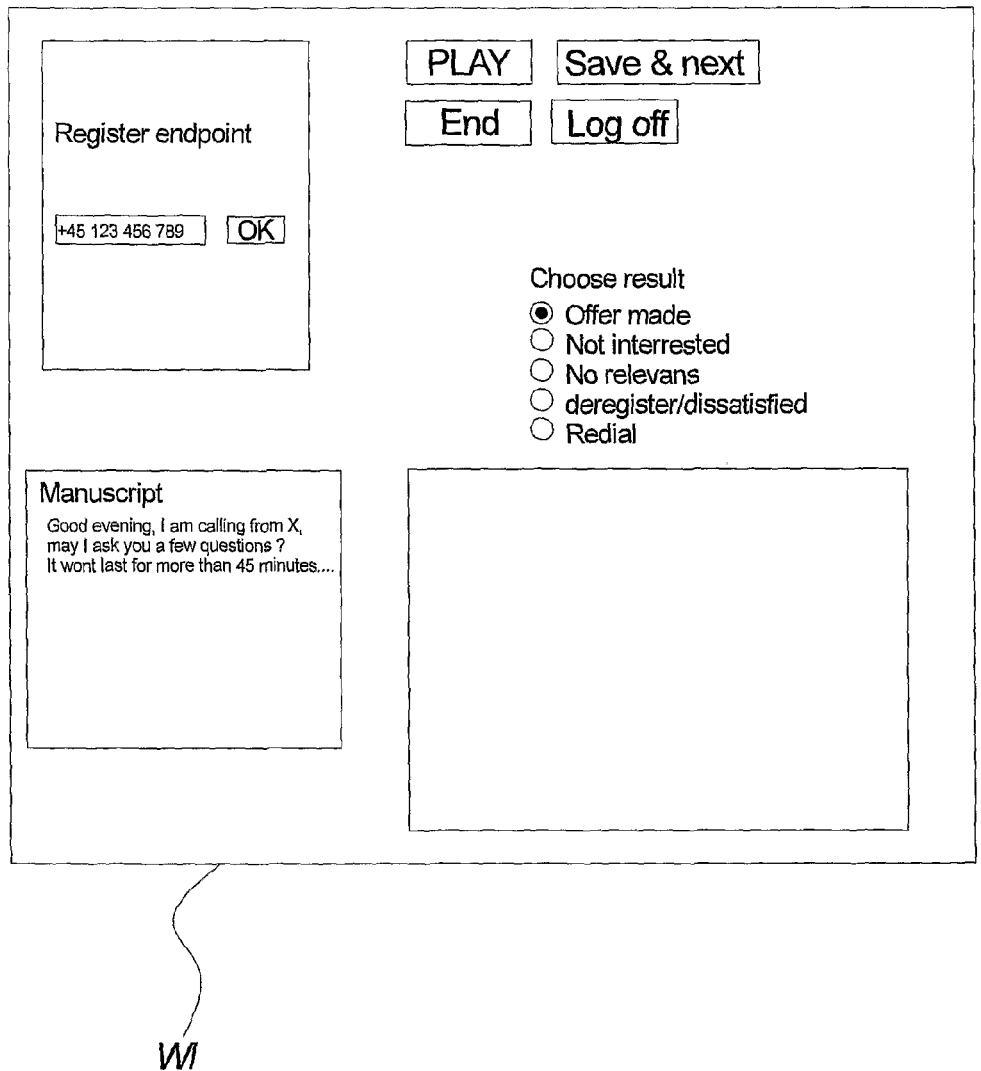
Figure 8:
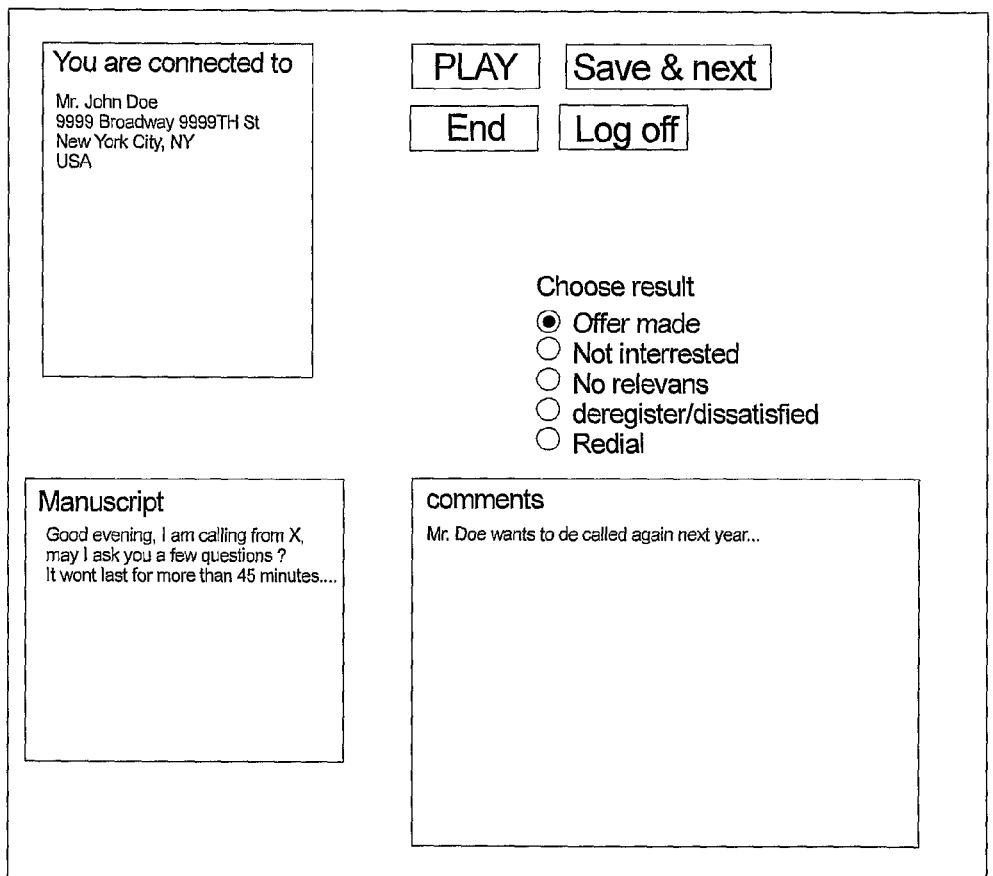
Figure 9:
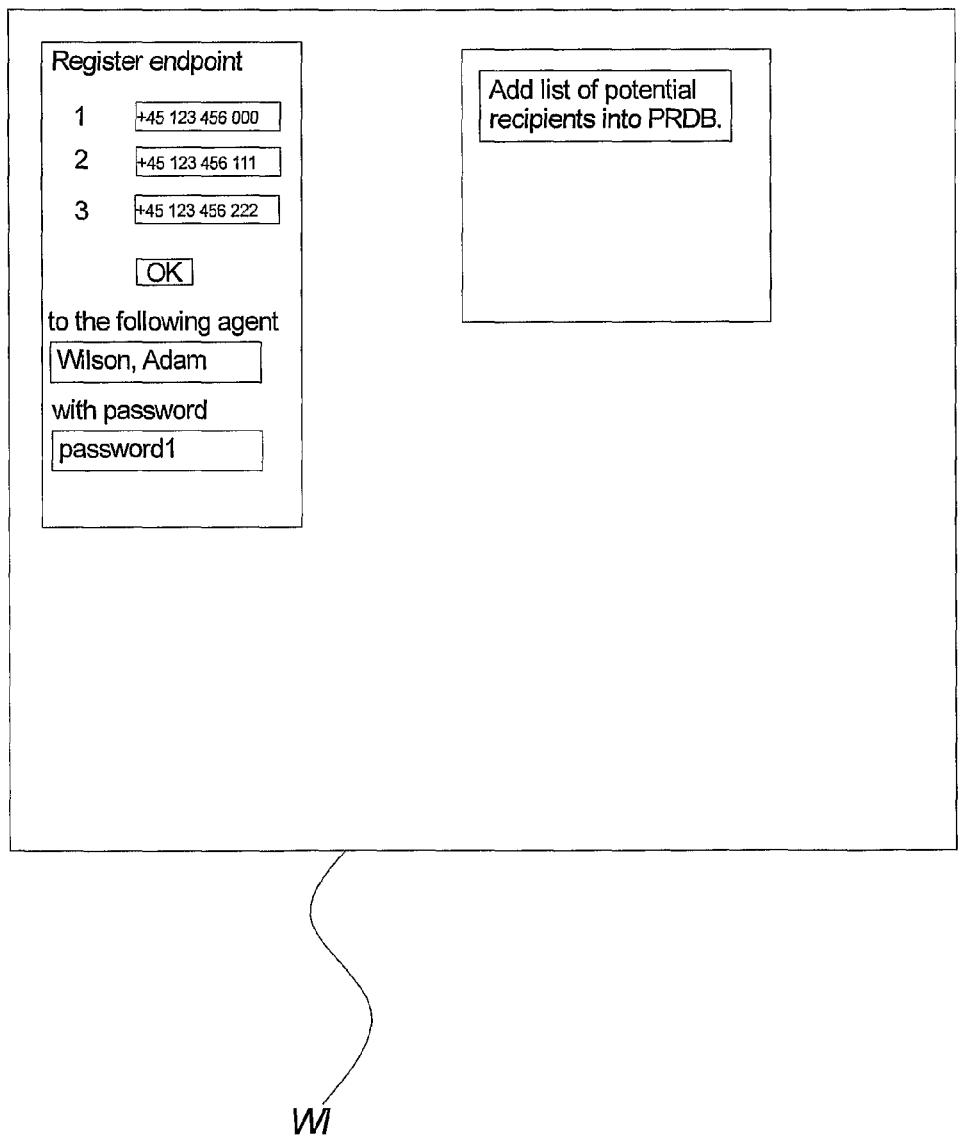

FIG. 1 illustrates an embodiment of the present invention,

FIG. 2 illustrates a basic non-limiting flowchart of an embodiment of the present invention, FIG. 2a illustrates a detailed view of the dynamic connection distributor pursuant to the flowchart in FIG. 2, FIG. 3 illustrates a basic non-limiting flowchart of an embodiment of the present invention, FIG. 3a illustrates a detailed view of the dynamic connection distributor pursuant to the flowchart in FIG. 3, FIG. 4 illustrates a timeline indicating a session, FIG. 5 illustrates a timeline indicating a session in a more detailed way, FIG. 6 illustrates a further embodiment of the present invention, FIG. 7 illustrates an example of an agent web-based interface, FIG. 8 illustrates an example of another agent web-based interface (WI) and FIG. 9 illustrates an example of an administrator web-based interface (WI).

DETAILED DESCRIPTION

FIG. 1 illustrates an embodiment of the present invention wherein the system comprises a dynamic connection distributor DCD, one or several potential recipients PR1, PR2, . . . , PRm, a recipient connection RC, a PSTN (PSTN: Public Switched Telecommunication Network) and/or a PDCN (PDCN: Public Data Communication Network). The dynamic connection distributor DCD may comprise a call linker CL, an agent pool AP, a potential recipient database PRDB, recipient information RI, an agent dialer AD and a recipient dialer RD. Furthermore, the system may comprise one or several call agents CA1, CA2, . . . , Cn, one or several agent connections AC, and one or several agent-defined endpoints ADE.

According to the present invention a public data communication network (PDCN) may e.g. refer to the internet, the World Wide Web or other public data networks.

A call agent CA1, CA2, . . . , CAn registers in the agent pool AP in said dynamic connection distributor DCD. This may be done in several ways according to the below descriptions of FIGS. 2, 3 and 4.

The agent dialer AD establishes an agent connection AC to said agent-defined endpoint ADE on the basis of said endpoint received from said call agents CA1, CA2, . . . , CAn by means of an initiating connection IC. The initiating connection IC may, according to the invention, be established by means of a telephonic call over PSTN, by mail or preferably over PDCN via a web interface. In other words, an initiating connection IC related to a specific agent connection may typically be at least partly maintained while the agent connection is established. When e.g. applying a web-based interface as initiating connection IC the initiating connection would typically be active longer than the established agent connection. Thus, an initiating connection would typically designate both the initiating connection as well as the part of the connection which is no longer directly relevant for establishment of the connection but rather relevant for maintaining the agent connection.

Thus, the illustrated initiating connections IC may also be regarded as the connections necessary to establish and maintain call sessions with respect to control of calls to the call agent and from the dynamic connection distributor DCD and with respect to logging of sessions, transfer or orders, transfer of order information, monitoring of agent performance, transfer of statistics, transfer of recipient relevant data, etc.

The technical meaning of the above-mentioned sessions is explained below.

It is moreover noted that this initiating connection, when also designating the maintaining connection, may be continuous or comprise a series of discrete communication data.

The initiating connection IC is typically established by a call agent CA to identify him to the connection distributor DCD and to submit an agent-defined endpoint ADE to the agent pool AP of the dynamic connection distributor DCD.

The agent connection AC is established according to the agent-defined endpoint ADE registered by the agent in the agent pool.

If a call agent CA1, CA2 . . . , CAn defines that he wants to be connected via a telephone on the PSTN by means of the agent-defined endpoint ADE and registers this endpoint in the agent pool AP, the agent connection AC may be established by means of a call through the PSTN.

If, alternatively, a call agent CA1, CA2 . . . , CAn defines that he wants to be connected via a PDCN device according to the agent-defined endpoint ADE and registers this endpoint in the agent pool AP, the agent connection AC may be established by establishment of IP-telephonic call, e.g. over VoIP, any hybrids thereof, or any suitable voice transferring communication means over PDCN.

If a call agent CA1, CA2 . . . , CAn defines that he wants to be connected via a telephone via a wireless network by means of the agent-defined endpoint ADE and registers this endpoint in the agent pool AP, the agent connection AC may be established by means of a telephonic call via a wireless network, such as e.g. GSM or UMTS.

The recipient dialer RD comprised by the dynamic connection distributor DCD retrieves recipient information RI from said potential recipient database $PRDB_s$ which comprises e.g. information related to name and further contact information of potential recipients PR1, PR2, . . . , PRm. The recipient dialer RD then establishes the recipient connection RC to the relevant potential recipient PR1, PR2, . . . , PRm on the basis of contact information comprised in the recipient information RI.

This procedure may be done several ways dependent of the telecommunication equipment of the respective potential recipient PR1, PR2, . . . , PRm. If a potential recipient PR1, PR2, . . . , PRm can be reached via a telephone on the PSTN, the recipient connection may be established by means of a call through the PSTN, if a potential recipient can be reached via PDCN, the recipient connection RC will constitute a PDCN connection and a following establishment of IP-telephonic call, e.g. over VoIP, any hybrids thereof, or any suitable voice transferring communication means over PDCN. Likewise, if a potential recipient may be reached by a mobile phone the recipient connection is established by means of a telephonic call via a wireless network, e.g. GSM or GPRS.

Currently, it is preferred that the connection to the recipients is established via PSTN as PSTN at the time being is still the most widespread system covering as many potential recipients as possible.

FIG. 2 illustrates a non-limiting flowchart of an embodiment of the present invention. Thus, the steps in the flowchart may occur in a different order than visualized in the flowchart. This flowchart shows an embodiment of the invention where the DCD establishes an agent call on the basis of an endpoint registered by a call agent. The description of the flowchart moreover refers to relevant components of FIG. 1

In step 21, a call agent AC registers in the agent pool AP to authenticate whereupon the agent pool AP may optionally perform a check of the current authorization permissions of the current call agent CA. Afterwards in step 22 the call agent CA registers an agent-defined endpoint ADE in the agent pool AP. The steps 21 and 22 may be performed by means of an initiating connection IC. In step 23, the agent dialer AD of the dynamic connection distributor DCD establishes an agent connection AC to a call agent AC on the basis of the received agent-defined endpoint ADE. In step 24, the dynamic connection distributor establishes an agent call through agent connection. The steps 23 and 24 may also be regarded as one step, namely that the agent dialer comprised by the dynamic connection distributor DCD dials a telephone number according to the agent-defined endpoint ADE to establish a call from the dynamic connection distributor DCD to a call agent CA. In step 25 a session is initiated. A session may be a series of calls to be established from the dynamic connection distributor DCD to at least one potential recipient PR. In other words, one agent call may be connected sequentially to several recipient calls. In step 26, the recipient dialer RD establishes a recipient connection RC to a recipient on the basis of contact information received from the potential recipient database PRDB. The recipient connection RC may in one embodiment of the invention be established by means of a telephonic call from the recipient dialer of the dynamic connection distributor DCD to a potential recipient PR. Step 27 is indicating that the call linker CL comprised in the dynamic connection distributor is performing a coupling of the outbound recipient connection RC and the outbound agent connection AC with regard to audio. This coupling may in one embodiment of the invention be performed after a potential recipient has answered the call made over the recipient connection RC. In this way, a so-called predictive dialer may be utilized by the dynamic connection distributor DCD to increase activity and utilization of call agents CA.

A predictive dialer exhibits predictive behavior when it has more call attempts (attempts to establish a recipient connection RC) outstanding than it has call agents CA that are already available to handle calls. The predictive dialing happens when the predictive dialer dials ahead of the agents becoming available or when the predictive dialer matches a forecast number of available agents with a forecast number of available called parties or potential recipients that has picked up the phone. The matching and dialing ahead perspectives provide the large increases in dial rates and call agent productivity.

If a system e.g. has 100 agents working on it, the dialer will dial a number of calls, sometimes crudely based on a phone line to agent ratio of 1.5:1 or 2:1. This means that for each available agent, the system will dial the phone numbers of two potential customers. As these calls are made to the telephone network, the dialer will monitor each call and determine what the outcome of the call was. From 150 calls made, the system will immediately strip out any unproductive outcomes, such as busy calls (these are usually queued for automatic redial), no answers and invalid numbers. Some predictive dialers incorporate "answering machine detection", which tries to determine if a live person or answering machine picked up the phone. This might cause delays before initiation of a conversation. If not enough calls are made ahead, then agents will sit idle, whereas if there are too many calls made and there are not enough agents to handle them, the call is typically dropped. The trick for predictive dialer manufacturers is to build their systems smart enough and large enough to be able to quickly respond by increasing or decreasing the dialing ratio used in order to cause more or less calls to be made. The advanced predictive dialer determines and uses many operating characteristics which are learned during the calling campaign. It uses these statistics continually to make sophisticated predictions so as to minimize agent idle time while controlling occurrences of nuisance calls, which are answered calls without the immediate benefit of available agents. An advanced predictive dialer can readily maintain the ratio of nuisance calls to answered calls at less than a fraction of one percent while still dialing ahead. However, this level of performance may require a sufficiently large critical mass of agents. A good predictive dialer should not always exhibit predictive behavior. That typically is when there are too few agents. In that case, each time the dialer contemplates a new call attempt the probability of no agent being available is too high unless there are more idle agents than call attempts—i.e. dials—outstanding.

According to the present invention the use of a predictive dialer according to the above description is only one possibility out og many, in that any type of dialer may be used by the dynamic connection distributor DCD.

Alternatively, the coupling may be performed before a potential recipient answers the call established through the recipient connection RC to avoid that a call agent CA is not ready when the potential recipient answers the call and the dynamic connection distributor couples the potential recipient PR and the call agent CA.

In step 28, a conversation may start between the potential recipient PR and a call agent CA. Information relating to the conversation(s) such as information related to number of calls between the specified agent and recipients, duration of these calls, success criteria measuring related to these calls, logging and updating of recipient feed-back, customer satisfaction evaluation of calls, etc., may be communicated to the dynamic connection distributor DCD actively or passively. An active retrieving of this information may be obtained by a survey system monitoring the activity of the call agent. A passive retrieval of information may e.g. rely on information reported and communicated from the call agent e.g. on runtime basis via the initiating connection IC as a part of the maintenance of the agent call.

In step 29, the conversation ends and a new conversation may be established within the same session by returning to step 26 or the session may terminate in step 30.

Thus, a session may comprise establishment of several recipient connections RC and may typically comprise only one agent connection AC.

FIG. 2a illustrates a further principle view of a dynamic connection distributor DCD according to an embodiment of the invention with reference to FIG. 2. The figure illustrates that a call agent CA registers an agent-defined endpoint ADE in the agent pool AP of the dynamic connection distributor DCD. The agent pool may comprise any number of agent-defined endpoints dependent of the current registered and active call agents CA. The agent pool may in one embodiment of the invention further comprise authentication information of the call agent, e.g. name and may further comprise the submission of a user name and a password to authenticate a call agent CA. Hereafter the agent dialer AD comprised in the dynamic connection distributor DCD may establish an agent connection AC to the agent via an endpoint defined by agent ADE. The agent dialer may establish a connection through a PSTN. If$_5$ alternatively, the agent dialer AD may establish a connection to the call agent CA via the agent-defined endpoint AD via a PDCN e.g. by establishment of IP-telephonic call, e.g. over VoIP, any hybrids thereof, or any suitable voice transferring communication means over PDCN.

FIG. 3 illustrates a basic non-limiting flowchart of a further embodiment of the present invention. This flowchart illustrates a further embodiment where the call agent establishes an agent-defined endpoint on the basis of a number of endpoints registered by the call agent at the dynamic connection distributor.

In step 31, a call agent pre-registers a number of different selectable endpoints which he intends to use as endpoint during call sessions. The number of selectable endpoints may in principle be very large, but it should however preferably be kept at a level where such a pre-registration does not result in further unnecessary time-consuming sign-up procedures.

The pre-registration of step 31 may in principle be performed at any time and not necessarily in relation to a start-up of a session.

In other words, step 31 is basically optional when at least one endpoint has been pre-registered and availing the dynamic connection distributor DCD to establish a session between the call agent in question and a recipient.

In step 32, the call agent may now initiate a session e.g. by means of a web-registration to the dynamic connection distributor DCD.

In step 33, the call agent may be authenticated and choose one of the pre-registered endpoints.

The steps 31-32 may be performed during an initiating connection IC although e.g. step 31 may just be performed once and thereafter become optional. In step 34 and 35, an agent dialer AD of the dynamic connection distributor DCD establishes an agent connection AC to a call agent AC on the basis of the determined agent-defined endpoint ADE. As previously mentioned, steps 34 and 35 may also be regarded as an action performed in one step, namely that the agent dialer comprised by the dynamic connection distributor DCD dials a telephone number according to the agent-defined endpoint ADE to establish a call from the dynamic connection distributor DCD to a call agent CA.

In step 36 a session is initiated. A session may be a series of calls to be established from the dynamic connection distributor DCD to at least one potential recipient PR. In other words, one agent call may be connected sequentially to several recipient calls. In step 37, the recipient dialer RD establishes a recipient connection RC to a recipient on the basis of contact information received from the potential recipient database PRDB. The recipient connection RC may in one embodiment of the invention be established by means of a telephonic call from the recipient dialer of the dynamic connection distributor DCD to a potential recipient PR. Step 38 designates that the call linker CL of the dynamic connection distributor is performing a coupling of the outbound recipient connection RC and the outbound agent connection AC with regard to audio. This coupling may in one embodiment of the invention be performed after a potential recipient has answered the call made over the recipient connection RC. In this way, a so-called predictive dialer may be utilized by the dynamic connection distributor DCD to increase activity and utilization of call agents CA.

Alternatively the coupling may be performed before a potential recipient answers the call established through the recipient connection RC to avoid that a call agent CA is not ready when the potential recipient answers the call and the dynamic connection distributor couples the potential recipient PR and the call agent CA.

In step 39, a conversation may start between the potential recipient PR and a call agent CA. Information relating to the conversation(s) such as information related to number of calls between the specified agent and recipients, duration of these calls, success criteria measuring related to these calls, logging and updating of recipient feed-back, customer satisfaction evaluation of calls, etc., may be communicated to the dynamic connection distributor DCD actively or passively. An active retrieving of this information may be obtained by a survey system monitoring the activity of the call agent. A passive retrieval of information may e.g. rely on information reported and communicated from the call agent e.g. on runtime basis via the initiating connection IC as a part of the maintenance of the agent call.

In step 40, the conversation ends. Now a new conversation may be initiated in step 37 or the session may terminate in step 41. Thus, a session may comprise establishment of several recipient connections RC and may typically comprise only one agent connection AC.

FIG. 3a illustrates a further principle view of a dynamic connection distributor DCD according to an embodiment of the invention with reference to FIG. 2. The figure illustrates that a call agent B registers an agent-defined endpoint ADE in agent pool AP of the dynamic connection distributor DCD by selecting one of the pre-registered endpoints, here EP2b.

One advantage of the present embodiment of the invention is that the sign-up procedure may be performed relatively fast as the call agent only needs to pinpoint the endpoint to be used by an agent and endpoint representing code AERC, e.g. "1" designating the call agents telephone number at home, "2" designation the call agents mobile telephone number, "3" designation an IP telephone number or ID, etc.

It should be noted that the above embodiment of the invention in principle maintains all benefits with respect to dynamics of the embodiment of FIG. 2 and FIG. 2a in the sense that no connections between the call agents are wired or fixed although some endpoints has been pre-registered. In others words, the system as such maintains full flexibility with respect to configuration of switches, etc. due to the fact that all such switching is basically performed externally in the PSTN or PCDN.

The agent pool may in one embodiment of the invention further comprise authentication information of the call agent, e.g. name, and may further comprise the submission of a user name and a password to authenticate a call agent CA.

It should also be noted that the agent pool AP may in principle have any size suitable for the ongoing setup of call connections as the effective switching is performed externally.

FIG. 4 illustrates a timeline constituting an example of a session SES according to an embodiment of the invention. A session SES comprises a number of calls C1, C2, C3, C4, ..., Cn established by the dynamic connection distributor DCD between a call agent CA and several potential recipients PR. Thus, a session SES may typically comprise one agent connection AC and several recipient connections RC.

FIG. 5 illustrates a more detailed timeline constituting an example of a session SES according to an embodiment of the invention. A session starts (1), when the dynamic connection distributor DCD establishes an agent connection AC on the basis of an agent-defined endpoint ADE (A). Subsequently, the agent dialer AD in the dynamic connection distributor DCD establishes an agent connection AC, (B). A recipient dialer RD in the dynamic connection distributor DCD establishes a new recipient connection RC (C). Hereafter the outbound agent connection AC and the outbound recipient connection RC of the dynamic connection distributor are coupled by means of a call linker CL (D). A conversation may start (E) and is subsequently ended (F).

The steps C, $D_5$ E and F may be repeated several times during a session. A session may end by means of a connection from the dynamic connection distributor DCD both to a potential recipient and to the call agent CA.

FIG. 6 illustrates a further embodiment of the present invention. This figure comprises the same elements as in FIG. 1, and in addition the figure comprises an endpoint robot ER that receives the agent-defined endpoints and processes these to the agent pool. The endpoint robot ER may e.g. comprise a computer facility enabling the flexibility of the invention to be implemented e.g. in connection with a conventional non-flexible system such as an ACD (ACD: automatic call distributor). According to a preferred embodiment of the invention, the dynamic connection distributor DCD is established without applying conventional non-flexible systems such as the above mentioned.

FIG. 7 illustrates an example of a web-based interface WI according to an embodiment of the present invention. The figure illustrates an agent interface at the time where an agent registers the current endpoint to where the dynamic connection distributor DCD must establish a connection. In the upper left corner of the figure is visualized a box where a call agent CA may enter a telephone number. In an alternately embodiment of the invention, an IP (IP: Internet protocol) address or another contact code may be entered.

FIG. 8 illustrates an example of a web-based interface WI according to an embodiment of the present invention. The figure illustrates an agent interface at the time of the dynamic connection distributor DCD having established a connection to a recipient information RI received from the potential recipient database PRDB is presented to the agent to give him or her the best provisions to make a success.

FIG. 9 illustrates an example of a web-based interface WI according to an embodiment of the present invention. The figure illustrates an administrator interface at the time when an administrator is registering a call agent CA in the agent pool AP op the dynamic connection distributor DCD. The figure is illustrating that a call agent CA is registered with three different associated telephone numbers. It is now possible for a call agent CA to choose from one of these three telephone numbers and thereby make the agent dialer AD in the dynamic connection distributor DCD establish a connection to the selected telephone number.

The invention claimed is:

1. A dynamic call connection distributor comprising:
   an agent pool, comprising information of call agents, said agent pool is at least partly configurable by a plurality of individual call agents,
   a recipient dialer, comprising circuitry for dialing at least one number of predefined potential recipients for establishment of a recipient connection,
   an agent dialer comprising circuitry for establishing an agent connection from said dynamic connection distributor to a call agent,
   a call linker comprising circuitry for linking said agent connection with said recipient connection,
   wherein said agent connection is an outbound agent connection,
   wherein the outbound agent connection is configured for being established by means of a public switched telecommunication network connection and/or a public data communication network connection,
   wherein said recipient connection is an outbound recipient connection,
   wherein the outbound recipient connection is configured for being established by means of a public switched telecommunication network connection and/or a public data communication network connection, and
   wherein said linking of said agent connection with said recipient connection comprises connection of said outbound agent connection and said outbound recipient connection with regard to audio.

2. A dynamic call connection distributor according to claim 1, wherein said agent pool is at least partly defined and maintained by distributed call agents by means of web interface.

3. A dynamic call connection distributor according to claim 1, wherein said dynamic connection distributor further comprises a potential recipient database, comprising information of potential recipients to be dialed by said recipient dialer.

4. A dynamic call connection distributor according to claim 1, wherein said call linker comprises circuitry for linking a call, answered by a recipient with a connection established to an available call agent.

5. A dynamic call connection distributor according to claim 1, wherein said dynamic connection distributor comprises circuitry for establishing an agent connection from said dynamic connection distributor to a call agent on the basis of an agent-defined endpoint.

6. A dynamic call connection distributor according to claim 5, wherein registering of said agent-defined endpoint in said agent pool comprises transmission of agent-defined endpoint information from said call agent to said agent pool through an initiating connection.

7. A dynamic call connection distributor according to claim 5, wherein an agent connection is maintained during an agent session, and wherein said session start-up involves receipt of an agent-defined endpoint transmitted from a remote call agent.

8. A dynamic call connection distributor according to claim 1, wherein said session start-up involves receipt of an agent-defined endpoint transmitted from a remote call agent via a Public Switched Telecommunication Network.

9. A dynamic call connection distributor according to claim 1, wherein said system further comprises:
   potential recipients defined by said dynamic connection distributor in said potential recipient database,
   a number of call agents, possessing the possibility to register an agent-defined endpoint in an agent pool located in said dynamic connection distributor, whereupon said dynamic connection distributor establishes a connection to said agent-defined endpoint.

10. Use of agent-defined endpoints to automatically establish a call between a potential recipient and a call agent by means of a central dynamic connection distributor according to claim 1.

11. A Dynamic connection distributor according to claim 1, comprising a web-based interface wherein said dynamic connection distributor is at least partly configured and maintained by distributed call agents via said web-based interface.

12. A Dynamic connection distributor according to claim 1, wherein said agent connection is a telephone connection established by means of a public switched telecommunication network connection.

13. A Dynamic connection distributor according to claim 1, wherein said agent connection is configured for being establish to a mobile phone.

14. Method of establishing a connection between a call agent and potential recipients in a system comprising,
   a dynamic connection distributor,
   potential recipients defined by said dynamic connection distributor in a potential recipient database,
   a number of call agents to be dynamically connected to said potential recipients via said dynamic connection distributor,
   said method comprising the steps of:
   transmitting an agent-defined endpoint to said dynamic connection distributor,
   establishing an agent connection from said dynamic connection distributor to said agent-defined endpoint, said agent connection being an outbound agent connection, the outbound agent connection being established by means of a public switched telecommunication network connection and/or a public data communication network connection,
   establishing a recipient connection to a recipient extracted from said potential recipient database, said recipient connection being an outbound recipient connection, the outbound recipient connection being established by means of a public switched telecommunication network connection and/or a public data communication network connection, and establishing an agent call via said outbound agent connection by coupling said outbound recipient connection and said outbound agent connection with regard to audio.

15. Method of establishing a connection between a call agent and potential recipients according to claim 14 in a system comprising:

a dynamic connection distributor, potential recipients defined by said dynamic connection distributor in a potential recipient database, a number of call agents to be dynamically connected to said potential recipients via said dynamic connection distributor, said method comprising the steps of transmitting agent-defined endpoint to said dynamic connection distributor, establishing an agent connection from said dynamic connection distributor to said agent-defined endpoint, establishing an agent call via said agent connection between a recipient extracted from a potential recipient database.

16. Method of establishing a connection between a call agent and potential recipients according to claim 14, wherein a web-based interface is presented to a user via a non-dedicated personal computer.

17. Method of establishing a connection between a call agent and potential recipients according to claim 14, wherein agent connection is established automatically on the basis of agent-defined endpoints.

18. Method of establishing a connection between a call agent and potential recipients according to claim 14, wherein said agent-defined endpoint comprises information of which address to contact over public data communication network.

19. Method of establishing a connection between a call agent and potential recipients according to claim 14, wherein said agent-defined endpoints are transmitted via said web-based interface over a public data communication network.

20. Use of agent-defined endpoints according to claim 19, wherein said agent-defined endpoint is transmitted by means of a web interface.

* * * * *